United States Patent [19]
Benedict et al.

[11] Patent Number: 5,950,514
[45] Date of Patent: Sep. 14, 1999

[54] MITER SAW BLADE GUARDS

[75] Inventors: Charles E. Benedict, Tallahassee, Fla.;
Douglas A. Newcomer, Commerce;
Gregory W. Hatcher, Cairo, both of
Ga.; Timothy M. Cheek; Douglas R. Stahl, both of Tallahassee, Fla.

[73] Assignee: Benedict Engineering Company, Tallahassee, Fla.

[21] Appl. No.: 08/807,226

[22] Filed: Feb. 28, 1997

[51] Int. Cl.[6] .............................. B27B 5/18; B27G 19/02
[52] U.S. Cl. ............................................. 83/397; 83/478
[58] Field of Search ..................... 83/397, 478, 471.3, 83/490, DIG. 1; 30/391

[56] References Cited

U.S. PATENT DOCUMENTS

| | | | |
|---|---|---|---|
| 2,589,309 | 3/1952 | Tompkins | 83/478 |
| 2,669,264 | 2/1954 | Wilson | 83/478 |
| 2,926,709 | 3/1960 | Kaley . | |
| 3,249,134 | 5/1966 | Vogl et al. . | |
| 3,913,437 | 10/1975 | Speer et al. . | |
| 3,965,787 | 6/1976 | Plischke | 83/478 |
| 4,150,598 | 4/1979 | Berends et al. | 83/478 |
| 4,343,213 | 8/1982 | Drixler . | |
| 4,805,504 | 2/1989 | Fushiya et al. . | |
| 4,869,142 | 9/1989 | Sato et al. . | |
| 4,892,022 | 1/1990 | Cotton et al. . | |
| 5,054,352 | 10/1991 | Fushiya et al. . | |
| 5,184,534 | 2/1993 | Lee . | |
| 5,353,670 | 10/1994 | Metzger, Jr. . | |

FOREIGN PATENT DOCUMENTS

2669252  11/1990  France .

Primary Examiner—Eugenia A. Jones
Attorney, Agent, or Firm—Dowell & Dowell,. P.C.

[57] ABSTRACT

Supplemental guards are pivotally mounted on opposite sides of a conventional saw blade housing associated with miter saws. The supplemental blade guards are mounted so as to normally extend outwardly beyond the cutting blade whenever a miter saw blade is not engaged with a workpiece. The supplemental guards are positively guided as they are pivoted relative to the saw blade by contact with a workpiece as the miter saw blade is lowered to a cutting position.

5 Claims, 6 Drawing Sheets

MITER SAW BLADE GUARDS

BACKGROUND OF THE INVENTION

1. Field of the Invention

This invention is generally directed to safety devices for miter saws and, more particularly, to supplemental blade guards for use with miter saws. The supplemental guards are pivotally mounted on opposite sides of the saw blade housing associated with a miter saw in such a manner that they extend below, forwardly and rearwardly of the cutting blade at all times until contact is actually made between the blade and a workpiece as the blade is lowered toward the workpiece at which time the supplemental guards are returned in abutting relationship with the workpiece.

2. History of the Related Art

Conventional miter saws normally incorporate a table or cutting surface upon which a workpiece is supported. The saws include cutting blades that are mounted within at least a fixed upper housing and, in some instances, may include secondary pivotal or moveable guards which are mechanically raised relative to the saw blade as the saw blade is lowered from a raised home or non-cutting position to a cutting position adjacent the table or cutting surface. Unfortunately, with conventional miter saws, a significant portion of the cutting blade is exposed, even when the saw is raised to a non-use position. This frequently results in an operator being injured by accidental contact with the blade.

To overcome the possibility of accidental injuries associated with miter saws, some manufacturers have incorporated moveable blade guards which cooperate with the fixed upper blade housings to partially cover the forward edge of the blade which would otherwise be exposed toward the operator. Such moveable blade guards are mechanically connected to the miter saw so as to be pivoted relative to the cutting blade when the blade is lowered toward a workpiece to thereby expose the cutting blade for purposes of cutting the workpiece. Unfortunately, in most instances, such moveable blade guards are positioned so that a significant portion of the cutting blade remains exposed before and after the workpiece is engaged by the cutting blade, thus creating a hazard which can lead to operator injury.

Examples of prior art miter-type saws including blade guards are disclosed in U.S. Pat. Nos. 4,343,213 to Drixler, 4,805,504 to Fushiya et al., 4,869,142 to Sato et al., 4,892,022 to Cotton et al., 5,054,352 to Fushiya et al., 5,184,534 to Lee and French Patent 2,669,252 to Michel et al.

SUMMARY OF THE INVENTION

The present invention is directed to supplemental guards for substantially continuously covering the saw blade of a conventional miter saw wherein the supplemental guards are pivotally mounted at a forward portion to a conventional upper guard associated with the miter saw. The outer and lower peripheral edges of each of the supplemental guards extend outwardly beyond the cutting edge of the saw blade at all times when the blade is raised above a workpiece. The outermost supplemental blade guard, that guard which is mounted on the conventional blade guard opposite to a motor housing associated with the miter saw, includes an arcuate slot which is generally concavely oriented toward the forward pivot point. A pin is provided which extends from the conventional blade guard and into the slot so that the slot of the outer supplemental blade guard slides relative to the pin as the blade guard contacts a workpiece when the saw blade is lowered to contact a workpiece. The inner supplemental blade guard, that guard which is positioned adjacent to the motor housing, includes a generally concavely configured upper edge which is cut out so as to provide space for the guard to extend about the motor housing when the inner guard is pivoted relative to the fixed guard as the saw blade is lowered to a cutting position. In one embodiment, an arcuate slot is formed in the inner blade guard and is concavely oriented relative to the forward pivot point of the inner supplemental blade guard. A guide pin is mounted to the conventional saw blade guard which extends into the slot of the inner supplemental blade guard to thereby serve as a guide for the inner blade guard as the blade guard is moved or pivoted relative to the conventional fixed blade guard.

In an alternate embodiment of the present invention, as opposed to providing an arcuate slot in the inner supplemental blade guard, a pair of spaced guide members may be mounted to the miter saw so as to extend on opposite sides of an end portion of the inner supplemental blade guard. The guide members confine the end portion of the inner blade guard as it moves relative to the fixed blade guard as the miter saw blade is lowered and raised.

It is the primary object of the present invention to provide safety guards for miter-type saws which can be fitted to existing saws as well as incorporated with newly manufactured saws and wherein the safety guards include a pair of supplemental generally flat blade guard members which are pivotally mounted at their forward ends on opposite sides of an existing conventional fixed upper blade guard associated with a saw. The guards are formed having a generally convex lower edge which is designed to extend outwardly beyond the cutting blade and are suspended so as to assume a covering relationship with respect to the cutting blade at all times when the cutting blade is raised above a workpiece. However, the guards are pivoted relative to the miter saw by contact with a workpiece as the miter saw blade is lowered and engages a workpiece.

It is also an object of the present invention to provide a low cost safety device for miter-type saws in the form of side mounted pivotal supplemental blade guards which prevent accidental contact with the cutting blade and which are pivoted to expose the saw blade only after the saw blade engages a workpiece so that the guards are automatically deployed in a protective relationship with respect to the blade at all times when the blade is raised from contact with the workpiece.

It is another object of the present invention to provide supplemental guards for miter-type saws which are operative to substantially prevent accidental contact with a saw blade by covering the saw blade at all times except when a portion of the blade is vertically penetrating a workpiece.

DESCRIPTION OF THE PREFERRED EMBODIMENT

Figure 1:
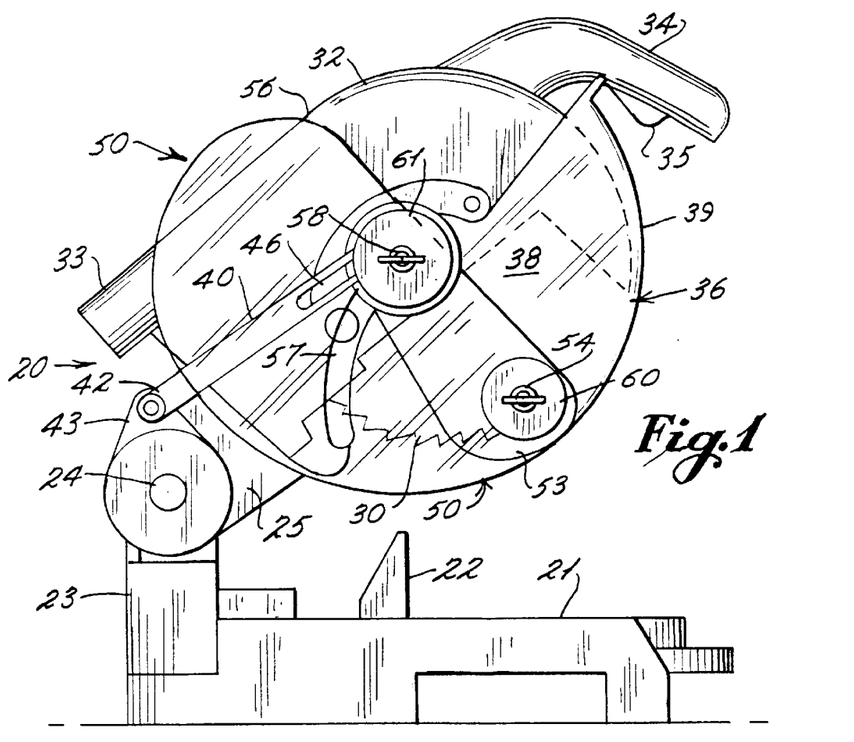
FIG. 1 is a right side view of a conventional miter saw assembly in the home or raised position with an installed supplemental blade guard in accordance with the teachings of the present invention.
Figure 2:
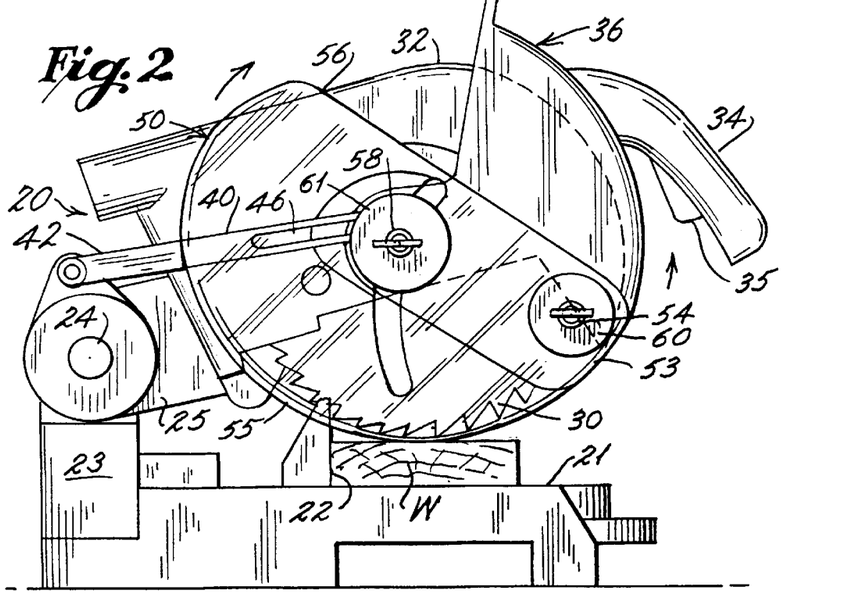
FIG. 2 is a right side illustrational view of the miter saw assembly of FIG. 1 in a lowered position in which the supplemental lower blade guard contacts a workpiece while fully covering the portion of the saw blade not covered by the partially retracted conventional blade guard.
Figure 3:
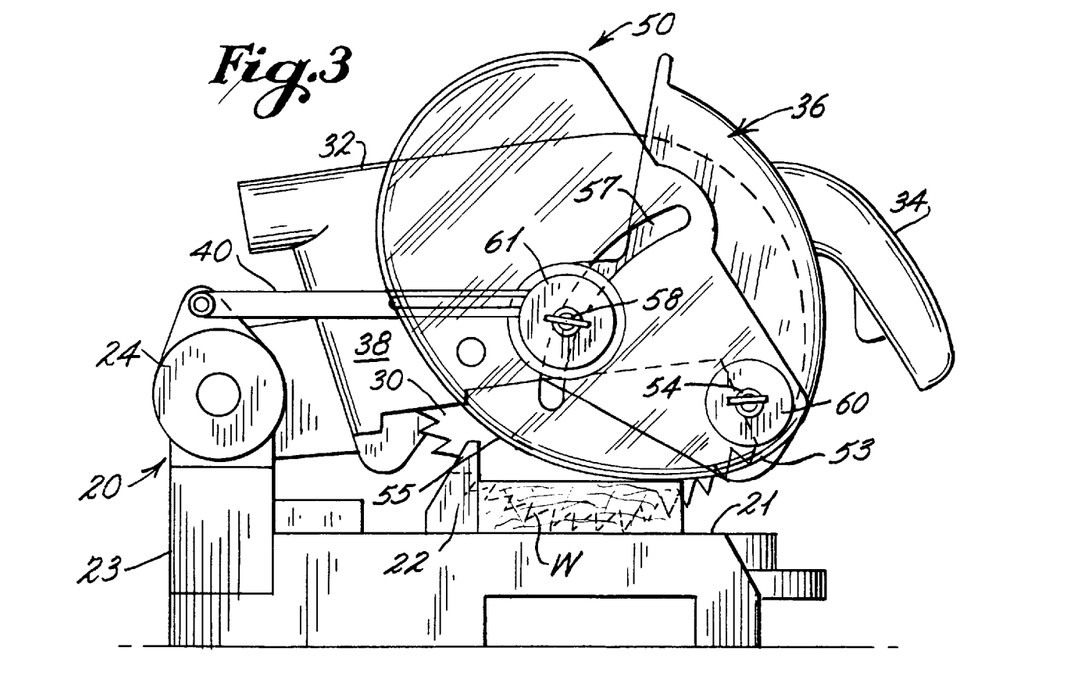
FIG. 3 is a right side illustrational view of the miter saw assembly of FIG. 2 in a cutting position.

FIG. 1 illustrates a first conventional miter saw assembly 20 which includes a support base or working surface 21 having a fence 22 disposed thereon. A bracket or frame member 23 extends upwardly from the base to a pivot joint 24. The pivot joint normally retains the saw in a raised or home position, such as shown in FIG. 1, but permits a forced lowering of the saw to cutting positions as shown in FIGS. 2 and 3. A support arm 25 is pivotally mounted relative to the support base 21 by being connected to the pivot joint 24.

Figure 4:
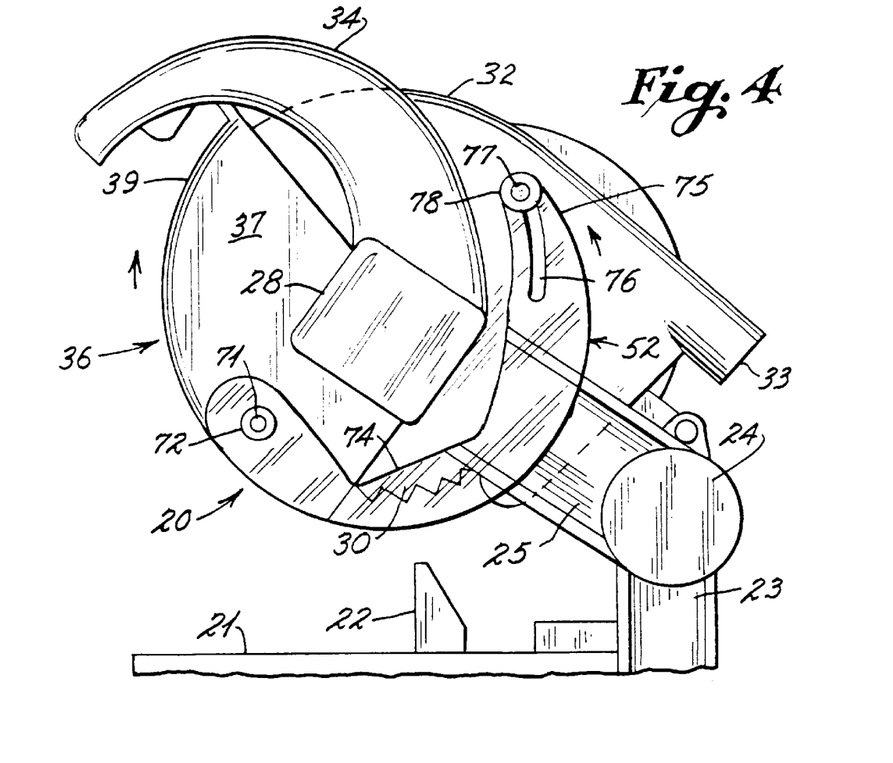
FIG. 4 is a left side view of the miter saw assembly of FIG. 1 in the home position showing a modified supplemental guard designed to bypass the motor housing when in use.

A drive motor including a drive shaft (not shown) is mounted within a housing 28 carried on the support arm 25, as shown in FIG. 4. A circular saw blade 30 is mounted on the drive shaft and a fixed upper blade guard 32 encloses the upper portion of the saw blade and includes a rear vent 33. The upper blade guard is attached to the motor housing in a conventional manner. A handle 34 extends from the housing 28 for use by an operator to raise and lower the saw blade with respect to the support base. The handle includes an ON/OFF switch 35 for activating the motor. Electricity is supplied to the miter saw via a power cord (not shown).

The saw assembly further includes a pivotal lower blade guard 36 which has inner and outer side walls 37 and 38 which are interconnected by a front wall 39 so that the guard encloses portions of the saw blade 30 therein. As shown in FIG. 1, the upper blade guard 32 extends over the upper portion of the cutting blade 30 and includes a forward nose portion 32 extending substantially forwardly of the saw blade. The moveable lower blade guard 36 extends outside of the fixed guard 32 and forwardly and downwardly relative to the cutting blade, leaving only a small portion of the blade exposed when the saw is in the home position. However, when the saw is lowered toward the cutting position shown at FIG. 3, the lower blade guard 36 is caused to pivot about a pivot axis, which is slightly offset with respect to the axis of the motor drive shaft, thereby effectively raising the lower pivot guard and exposing a substantial portion of the cutting edge of the blade 30, as shown in FIG. 3. Automatic control of the pivotal movement of the lower blade guard is achieved by providing a linkage 40 having one end 42 pivotally connected to a bracket 43 mounted above the pivot joint 24 and an opposite end 46 pivotally connected to a portion of the lower blade guard 36.

The present invention is made to provide a supplemental guard for covering the exposed outer portions of the cutting blade 30 as well as portions which are exposed as the moveable blade guard 36 is retracted when the miter saw is lowered to the cutting position shown in FIGS. 2 and 3. For purposes of clarity, the invention will be disclosed as including transparent or translucent high-impact plastic materials to form the supplemental blade guards, however, in use, the material may be metal or any other of high-impact plastic. In the first embodiment, the supplemental blade guards 50 and 52 are mounted on opposite sides of the lower pivotal blade guard 36. In the drawing figures, guard 50 is mounted on the right side of the lower guard 36 whereas guard 52 is mounted on the left or motor housing side of the blade guard 36. Supplemental guard 50 includes a forward portion 53 which may extend slightly forwardly with respect to the guard 36 and which is pivotally attached thereto by a pivot connector 54. The pivot connector 54 extends through the lower or forward nose portion of the moveable guard 36. The guard 50 includes an outer arcuate edge 55 which is generally convex in configuration and which extends from the forward portion 53 to a rear or upper portion 56. An arcuate slot 57 is provided through the body of the guard 50 with the slot 57 being concave in the direction of the pivot connector 54. The slot is designed to slide relative to a guide pin 58 which is secured to the upper fixed blade guard 32. In order to provide relatively easy sliding motion between the supplemental guard 50 and the conventional blade guards, low friction plastic washers 60 and 61 are provided therebetween at the pivot connector 54 and the guide pin 58. The washers not only provide for a slight spacing between the components but also provide a sliding surface to facilitate relative movement therebetween. Appropriate fasteners may be used to secure the guard 50 at the points of attachment at 54 and 58.

During the operation of the saw, when the saw is in the home position of FIG. 1, the outer plate 50 will extend fully down covering all lower edge portions of the saw blade 30. In this position, the upper end 66 of the slot 57 is engaged about the guide pin 58. As the saw is lowered to the cutting position of FIGS. 2 and 3, the guard 50 pivots about the pivot connector 54 as soon as the guard contacts a workpiece "W" mounted on the support base 21. As the saw continues to be lowered, the supplemental guard 50 is pivoted about the axis 54 as the slot 57 slides relative to the guide pin 58. It should be noted that at all times, the lower and forward portions of the cutting blade are continuously protected by the supplemental blade guard 50. As the saw is returned to the home or retracted position, the guard 50 will descend by gravity to fully cover all portions of the cutting blade.

With reference to FIG. 4, on the left side of the housing, the supplemental guard 52 has been configured so as to provide clearance for the motor housing 28. The guard 52 includes a lower convex edge portion 70 which may extend slightly forward of and below the movable guard 36 and which is pivotally connected adjacent the lower and forward portion of the upper blade guard 32 by a pivot connector 71. A friction reducing washer 72 may be provided between the guard 52 and the moveable lower blade guard 36. The guard 52 includes a somewhat concave upper edge 74 which is cut out so as to provide clearance for the motor housing 28 and also includes an upper or rear portion 75. An elongated arcuate slot 76 is provided along the rear portion and is concave in the direction of the pivot connector 71. A fixed guide pin 77 is mounted to the upper guard 32 and extends through the slot 76. A washer 78 may be used between the head of the pin and the guard 52 to reduce friction.

As with guard 50, as the saw is lowered toward a workpiece, the guard 52 is normally retained by gravity in a position forwardly and below the cutting edge. When the workpiece is encountered by the guard 52, the guard will pivot about the pivot axis 71 with the slot sliding relative to the pin 77, thereby at all times covering both the side and the forward portion of the cutting blade as the blade makes contact with the workpiece. As the saw is raised to the home position, guard 52 descends by gravity to the fully covered position.

In view of the foregoing, it should be noted that the supplemental saw guards 50 and 52 at all time prevent accidental contact with portions of the cutting blade which would otherwise be exposed by the pivotal movement of the lower conventional blade guard.

Figure 5:
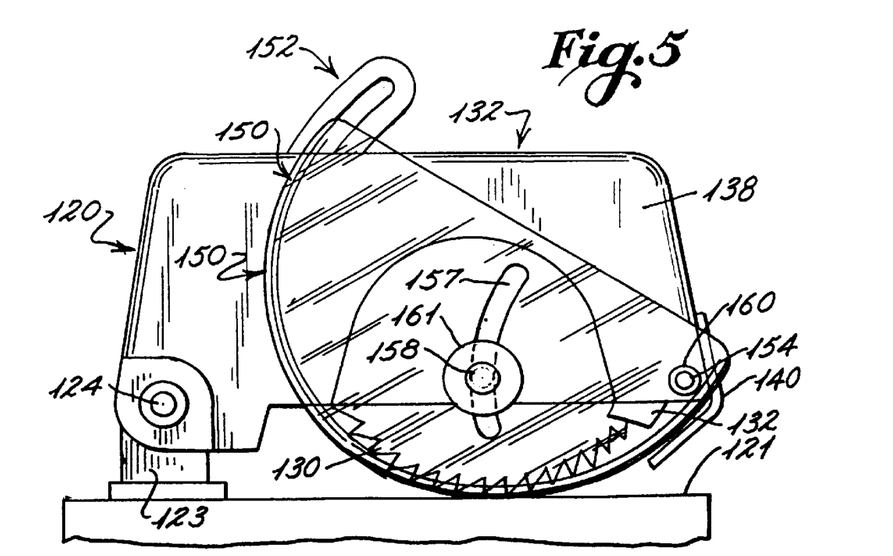
FIG. 5 is a right side illustrational view showing another embodiment of a miter saw incorporating the supplemental blade guards of the present invention.
Figure 6:
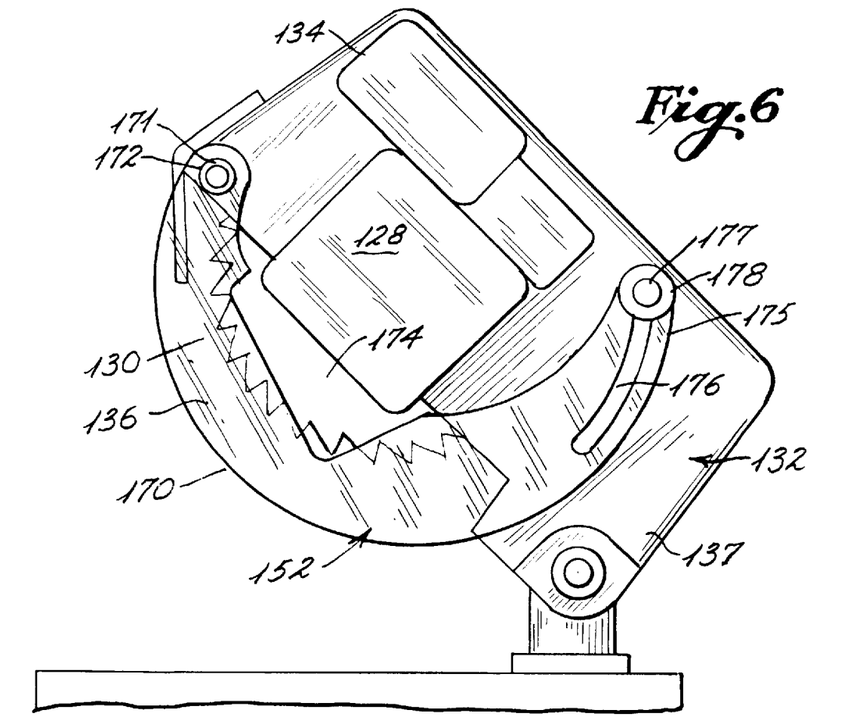
FIG. 6 is a left side illustrational of the miter saw shown in FIG. 5 with the miter saw being raised to a home position with the supplemental blade guards depending below the cutting blade.
Figure 7:
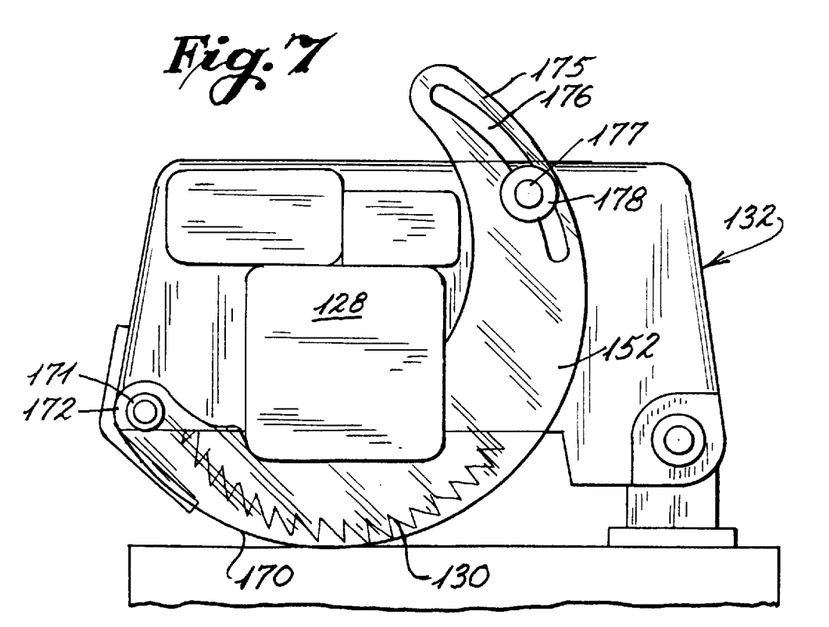
FIG. 7 is a view similar to FIG. 6 except showing the miter saw lowered to a cutting position wherein the supplemental blade guard is pivoted upwardly with respect to the fixed housing of the miter saw.
Figure 8:
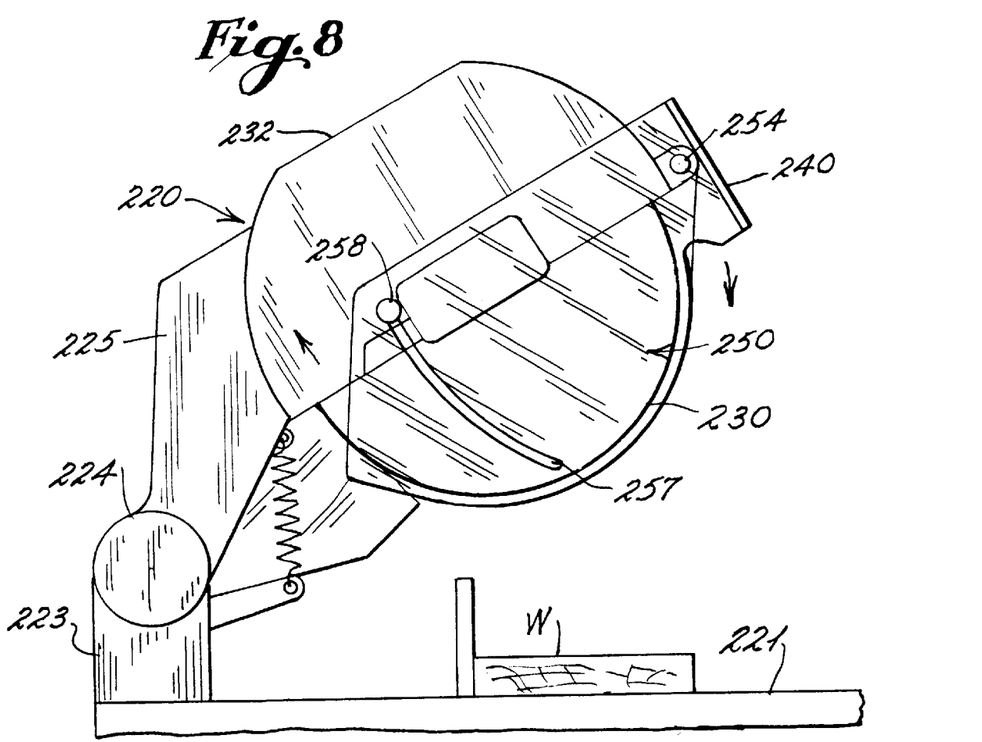
FIG. 8 is a right side illustrational view of another embodiment of a miter saw incorporating the supplemental blade guards of the present invention showing the saw in the raised or home position.
Figure 9:
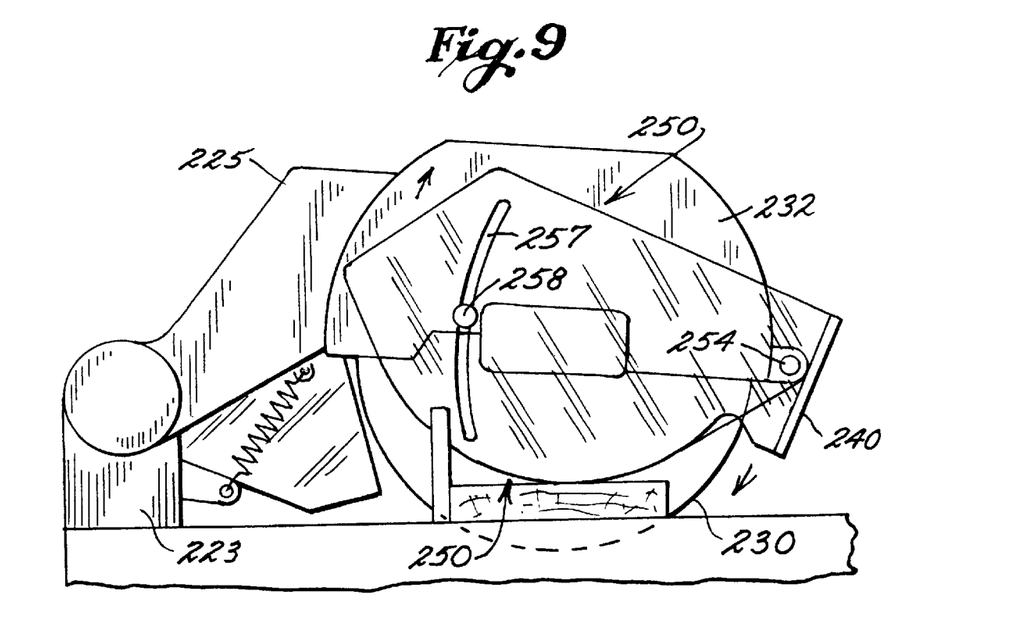
FIG. 9 is a view similar to FIG. 8 except showing the saw being lowered to a cutting position.

With reference to FIGS. 5–7, a second embodiment of the invention is disclosed in greater detail. In this embodiment, the miter saw 120 includes a support base 121 from which extends a bracket 123 which supports an upper blade guard 132 which is pivotally mounted at 124 to the bracket 123. The miter saw 120 includes a motor housing 128 from which a drive shaft (not shown) extends and which drivingly supports a saw blade 130. The upper blade guard 132 has opposing side walls and a front wall which encase the upper portion of the saw blade 130. A forward nose guard 140 is mounted to the front wall of the upper blade guard 132 and inclines downwardly and rearwardly toward the saw blade as shown in FIGS. 5–7. The saw also includes a moveable lower blade guard or scabbard 136 which normally covers the lower portion of the saw blade when the saw is in the raised home position of FIG. 6 but which is automatically pivoted away from the blade as the saw is lowered to the cutting position of FIGS. 5 and 7. In this embodiment, the supplemental blade guards 150 and 152 are pivotally mounted on opposite sides of the upper conventional guard 132.

As shown in FIG. 5, the supplemental blade guard 150 includes a forward portion 153 which extends forwardly of the cutting blade 130 and is pivotally connected at 154 to the forward and lower portion of the conventional upper blade guard 132. A suitable friction washer 160 may be utilized at the pivot point 154. The supplemental guard 150 is configured generally as a semi-circular plate and includes a generally arcuate slot 157 which is somewhat concave toward a front pivot point 154. A guide pin 158 is mounted through the side wall 138 of the upper guard 132 and extends through the arcuate slot 157. A friction reducing washer 161 may be provided to prevent the guard from being disengaged from the pivot pin 158.

As with the previous embodiment, the guard is designed to normally extend below, forwardly and rearwardly of the lower portion of the cutting blade 130 when the miter saw is in a raised or home position. As the saw is lowered to the cutting position shown at FIG. 5, the guard will engage a workpiece causing it to pivot about the pivot point 154. The guard 150 is positively guided by the guide pin 158 which rides along the slot 157. When the saw is again raised after a cut is made, the guard will fall by gravity to prevent accidental engagement with the cutting blade.

In the present embodiment, the opposite supplemental blade guard 152 is pivotally mounted at its forward end to a pivot pin 171 which may be integrally formed with pivot pin 154. A suitable friction-reducing washer 172 may be provided about the pin 171. The lower edge of the supplemental blade guard 152 is generally convex in configuration while the upper edge 174 is generally concave but is cut out so as to conform to the configuration of the motor housing 128. The guard 152 includes a rear portion 175 having an elongated arcuate slot 176 therein which is generally concave in the direction of the pivot pin 171. A fixed guide pin 177 is secured to the side 137 of the conventional upper guard of the miter saw. A friction-reducing washer 178 may be provided to facilitate the movement of the guard 152 relative to the fixed pin 177 which extends through the slot 176. In operation, and as shown in FIGS. 6 and 7, as the miter saw is lowered from the home position of FIG. 6 to the cutting position of FIG. 7, the guard 152 will engage a workpiece and pivot about the pivot pin 171 while being guided by the guide pin 177 which rides in the arcuate slot 176. When the saw is again raised toward the home position, the blade guard 152 will fall by gravity to ensure that the blade 130 is obscured at all times with the exception of when the blade is actually engaged with a workpiece.

With continued reference to FIGS. 8–11, a third embodiment of the present invention is disclosed in greater detail. In this embodiment, the miter saw 220 includes a work surface 221 from which vertically extends a bracket assembly 223. A saw support arm 225 is pivotally mounted at 224 to the bracket assembly 223. This support arm supports a fixed upper blade guard assembly 232 and a motor housing 228. A handle 234 extends upwardly from the motor housing for use in controlling the movement of the miter saw. A generally U-shaped front guard 240 is mounted to the forward end of the upper fixed guard 232 so as to provide further protection at the forward point of a blade 230 drivingly connected to the motor mounted within the motor housing. In this embodiment, a conventional moveable lower blade guard (not shown) is mounted within the upper fixed blade guard assembly and is controlled so as to pivot away from the cutting blade 230 as the saw descends from the raised home position of FIG. 8 to the lowered cutting position shown in FIG. 9.

In the embodiment, the supplemental blade guards 250 and 252 operate in a manner similar to the previous embodiments. Blade guard 250 is pivotally mounted to the forward guard member 240 by a pivot connector 254. Suitable friction-reducing washers 260 may be utilized to facilitate the pivotal movement of the supplemental blade guard 250 relative to the pivot connector 254. The supplemental guard 250 includes an arcuate slot 257 which is generally concave towards the pivot connector 254. A fixed guide pin 258 is mounted to the fixed upper housing 232 of the miter saw. A suitable friction-reducing washer 261 may be provided about the pin 258 in order to facilitate the relative movement of the supplemental guide 250 relative to the guide pin. When the saw is in the raised or home position of FIG. 8, it is noted that the guard 250 falls by gravity so as to completely cover the saw blade 230 which is exposed beneath the fixed guard 232. However, as the cutting blade is lowered to the cutting position of FIG. 9, the guard 250 engages the workpiece "W" and is pivoted about the pivot connector 254. In this manner, the supplemental guard 250 prevents accidental contact with the cutting blade at all times until the cutting blade engages the workpiece.

Figure 10:
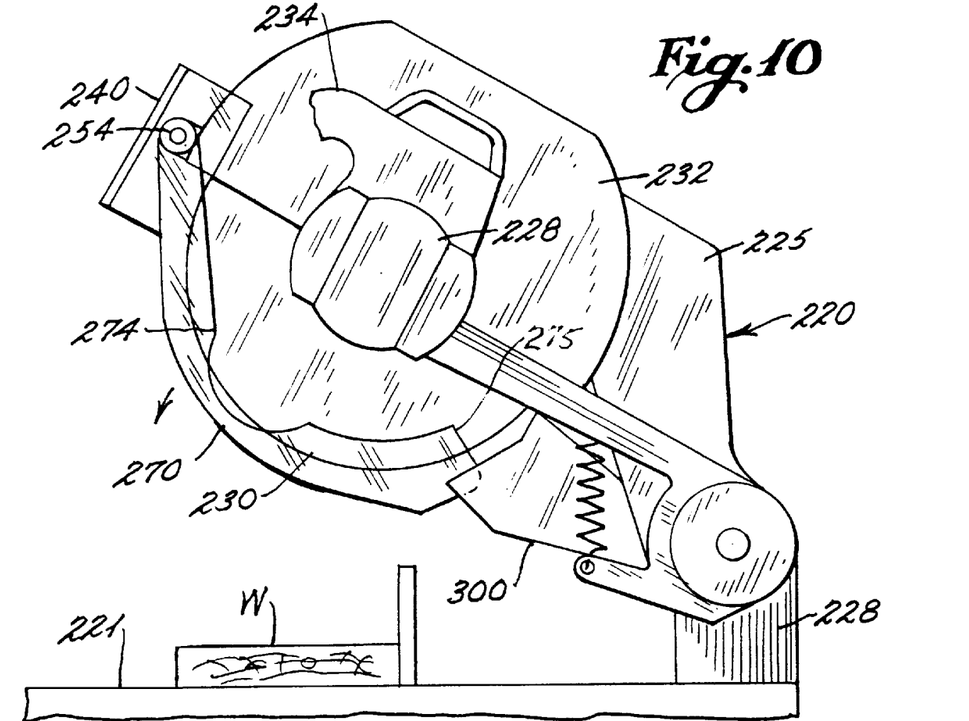
FIG. 10 is a left side illustrational view of the saw of FIG. 8 shown in the raised position.
Figure 11:
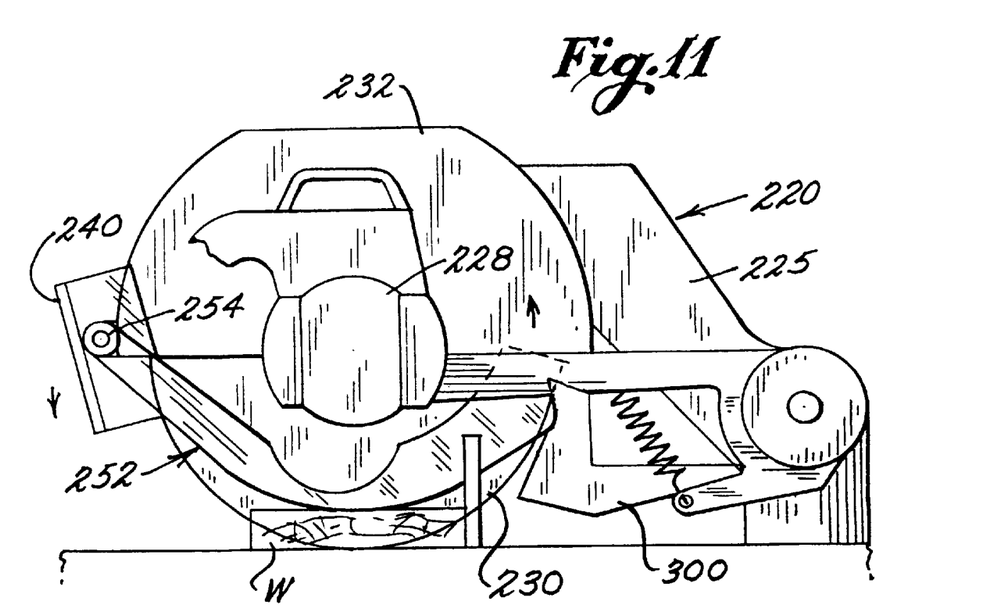
FIG. 11 is a view similar to FIG. 10 showing the saw being lowered to a cutting position.

With specific reference to FIGS. 10 and 11, the opposite supplemental blade guard 252 is pivotally connected at its forward end to the pivot connector 254 which extends through the forward guard 240. A friction-reducing washer may be provided about the pivot connector 254. The lower edge 270 of the supplemental guard 252 is generally convex and extends forwardly and below the cutting blade 230 at all times when the saw blade is in a raised position and until the supplemental guard 252 actually engages a workpiece as shown in FIG. 11. The upper edge 274 of the blade guard 252 is generally concave but includes a cut-out which is configured to be compatible to the configuration of the motor housing 228. Unlike the previous embodiments, in this embodiment, the rear portion 275 of the blade guard 252 does not include a guide slot. Rather, the rear portion 275 is guided between a pair of guide plates 300 which are mounted in spaced relationship with respect to one another beneath the support arm of the radial arm saw. The guide plates are fixed but define a channel in which the rear portion 275 of the blade guard 252 is designed to be deployed and guided. The guard operates by gravity so as to cover the lower edges of the cutting blade 230 until contact is made with a workpiece "W" at which time the guard 252 pivots about the pivot axis 254 with the rear portion thereof being guided between the plates 300.

The foregoing description of the preferred embodiment of the invention has been presented to illustrate the principles of the invention and not to limit the invention to the particular embodiment illustrated. It is intended that the scope of the invention be defined by all of the embodiments encompassed within the following claims and their equivalents.

What is claimed:

1. In a miter saw having a motor mounted within a motor housing, wherein said motor includes a drive shaft to which a cutting blade is mounted and wherein a blade guard assembly is provided including a fixed upper blade guard housing having opposite side walls, wherein said blade guard housing is mounted so as to enclose an upper portion of the cutting blade and wherein the blade guard assembly further includes a moveable lower blade guard including side walls spaced on opposite sides of the cutting blade, wherein said side walls of said movable lower blade guard pivot away from a covering relationship with a lower portion of the cutting blade below the upper portion when the cutting blade is lowered from an upper position toward a lower cutting position, relative to a workpiece and wherein the side walls of the moveable lower blade guard include front and rear portions, the improvement comprising, first and second supplemental blade guards each having upper and lower edges and front and rear portions, first pivot means for pivotally mounting said front portion of said first supplemental blade guard to the front portion of one of the side walls of the moveable lower blade guard and second pivot means for pivotally mounting said front portion of said second supplemental blade guard to the front portion of the other of the side walls of the moveable lower blade guard so that the lower edges of said first and second supplemental blade guards extend outwardly beyond the lower portion of the cutting blade, guide means extending outwardly from each of the opposite side walls of the fixed upper blade guard housing thereof for guidingly engaging said first and second supplemental blade guards as they pivot about said first and second pivot means, respectively, and said first and second supplemental blade guards being moveable downwardly to cover the lower portion of the cutting blade as the moveable lower blade guard is pivoted away from a covering relationship with the lower portion of the cutting blade to thereby cover the lower portion of the cutting blade until the first and second supplemental blade guards engage the workpiece.

2. The improvement for a miter saw of claim 1 wherein each of said first and second supplemental blade guards includes an arcuate slot therein, each of said slots being spaced from said first and second pivot means, respectively, and being concavely configured in a direction oriented toward said first and second pivot means, respectively, and said guide means extending in said slots in said first and second supplemental blade guards.

3. The improvement for a miter saw of claim 2 wherein said lower edge of each of said first and second supplemental blade guards is generally convex in configuration and said upper edge of said second supplemental blade guard is generally concave in configuration.

4. The improvement for a miter saw of claim 3 wherein said upper edge of said second supplemental blade guard includes a cut out portion therein for providing clearance for the motor housing as said second supplemental blade guard is pivoted relative to the motor housing.

5. The improvement for a miter saw of claim 4 wherein said slot in said second supplemental blade guard is formed in said rear portion thereof.

* * * * *